May 31, 1932.  E. BUGATTI  1,860,770
BRAKE
Filed Nov. 13, 1929    2 Sheets-Sheet 1
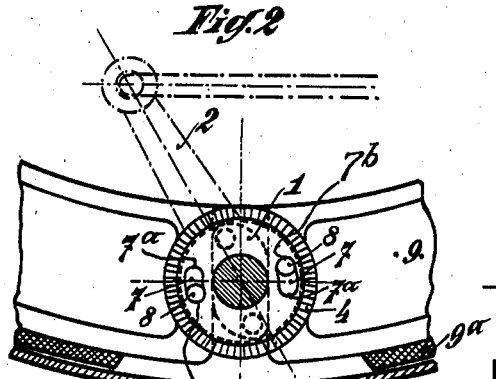
Fig.2
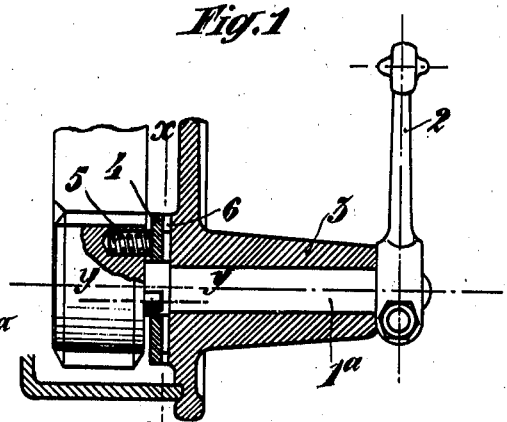
Fig.1
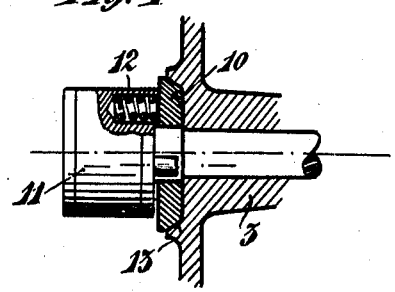
Fig.4
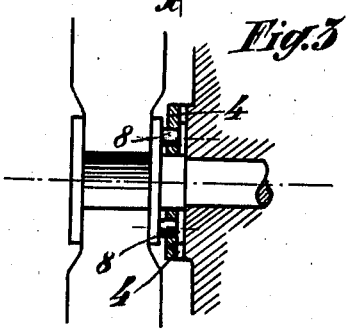
Fig.3
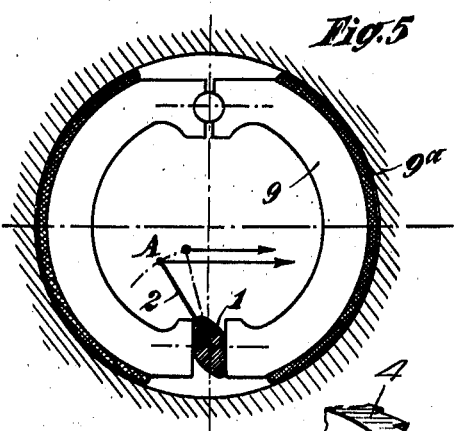
Fig.5
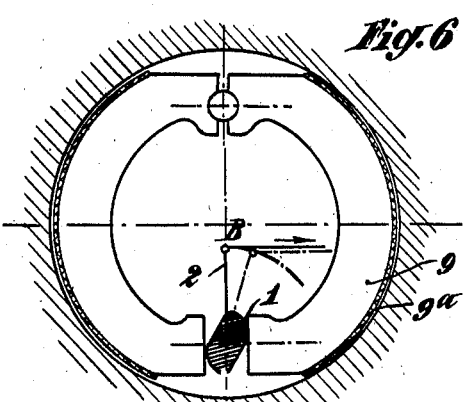
Fig.6
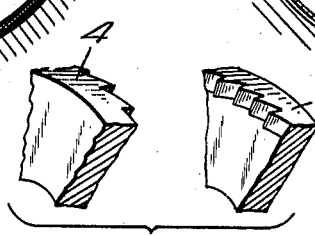
Fig.1ª
Inventor:
Ettore Bugatti,
By Mauro & Lewis
Attorneys

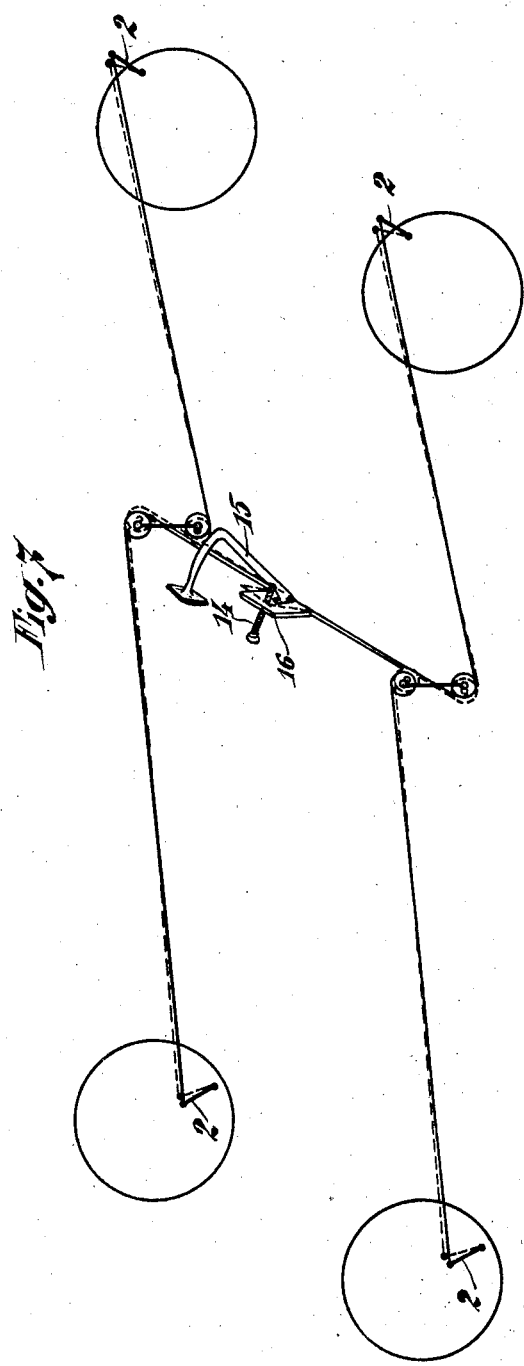

Patented May 31, 1932

1,860,770

UNITED STATES PATENT OFFICE

ETTORE BUGATTI, OF MOLSHEIM, FRANCE

BRAKE

Application filed November 13, 1929, Serial No. 406,944, and in France November 13, 1928.

The present invention has for an object a brake with automatic taking up of play. Said brake is characterized by a mechanism disposed preferably between the cam and the frame or support of the control shaft of the cam, and arranged in a way to remain inoperative as long as the amplitude of angular displacement of the cam from an initial position is less than a predetermined value, and to modify the said initial position an amount corresponding to the play resulting from the wear of the lining in a way to take up for this play.

The invention likewise includes an adjusting device for the brake pedal, permitting a conservation of the normal stroke of said pedal irrespective of the play taken up.

The description which follows with respect to the accompanying drawings given by way of example will allow the manner in which the invention is carried out to be well understood.

In the drawings—

Fig. 1 is a longitudinal section partly in elevation of the brake device;

Fig. 1ª is a detail in perspective of parts of the braking means;

Fig. 2 is a section along the line $x$—$x$ of Fig. 1;

Fig. 3 is a partial section along the line $y$—$y$ of Fig. 1;

Fig. 4 is a modification of Fig. 1;

Figs. 5 and 6 illustrate how taking up for play is produced; and

Fig. 7 is a diagrammatic view of the whole of the brake device with a device for adjusting the position of the brake pedal.

Referring to the drawings the cams of the brake 1 of ordinary shape are controlled by the levers 2. Between the body of the brake cam 1 and the frame 3, which carries the shaft thereof 1ª, is placed a ratchet toothed washer 4, retained by springs 5 in contact with teeth 6 secured to the frame 3 or integral therewith. In the washer are machined slots 7 in which engage fingers or pins 8 rigid with the brake cam 1 and allowing the cam just the angular stroke necessary to clamp the shoes 9.

When due to wear of the lining 9ª of the shoes 9, the cam 1 must travel an angular stroke which is larger, the fingers come in contact with the edges 7ª of grooves 7 and drive the washer 4 in their rotation, which movement is possible from the shape of the teeth 4 and 6 which allows release and rotation only in the direction of clamping of the cam.

Upon releasing the brake, the cam 1 does not retake the initial position which it had before-clamping, but an advanced position with respect to the said initial position. This advance corresponds to the angular displacement of the toothed washer 4 due to wear of the lining 9ª of the shoes 9. The cam is arrested in this new position by the end 7ᵇ of the slots 7 against which abut the fingers 8. From this fact, the stroke of the brake cam remains always constant, irrespective of the wear of the lining.

According to the modified embodiment illustrated the toothed washer is replaced by a washer 10 having a tapered edge which arrests the cam 11 after its return to the non-clamping position by friction instigated by the springs 12 which apply the washer 10 in its recess 13.

It is well to notice that if the lever of the brake cam occupies the position A (Fig. 5) with the shoes having a fresh lining, it takes, as soon as the lining is used, the position B (Fig. 6) which would cause the brake pedal to descend as fast as the taking up for play of the brake cams and at the same time diminish the available stroke for braking. For compensating this descent, a screw 14 placed between the pedal 15 (Fig. 7) and the bearing 16 permits bringing back the pedal to the position that it had with the new shoes and to retain the entire stroke for braking.

I adjust the cables connecting the brake cam levers 2 with the control device therefor so that they remain slack as long as they are not operated. This arrangement prevents movement of the cams, during shaking of the springs or deformation of the chassis when the wheels pass over uneven parts of the ground, which movements when repeated could cause wear of the shafts and of the cams or their bearing surfaces. As shown in Fig. 1ª the shape of the teeth on part 4 and of the corresponding teeth 6 is such as to permit one-way rotation only of member 4.

It will be obvious that many modifications could be made in my device without departing from the spirit of the invention as comprehended within the scope of the appended claims.

Having described my invention what I claim as new and desire to secure by Letters Patent is:

1. An automatic compensating brake of the type described comprising a pair of brake shoes, camming means for spreading said brake shoes, an operating shaft for said camming means, a bearing for said shaft, an annular plate on said shaft having circular slots, resilient means for pressing said plate against said bearing, a series of ratchet teeth on said plate next said bearing, corresponding ratchet teeth on said bearing engaging said first mentioned ratchet teeth, and fingers on said camming means engaging in said circular slots for the purpose described.

2. An automatic compensating brake of the type described comprising a pair of brake shoes, camming means for spreading said brake shoes, an operating shaft for said camming means, a bearing for said shaft, an annular plate on said shaft having circular slots, resilient means for pressing said plate against said bearing, a series of ratchet teeth on said plate next said bearing, corresponding ratchet teeth on said bearing engaging said first mentioned ratchet teeth, fingers on said camming means engaging said circular slots, a manually operated pedal for said camming means and an adjustable stop screw for said pedal adapted to compensate for loss of stroke as said operating shaft is advanced.

In testimony whereof I have signed this specification.

ETTORE BUGATTI.